United States Patent
Malekkhosravi et al.

(10) Patent No.: US 7,032,191 B2
(45) Date of Patent: Apr. 18, 2006

(54) METHOD AND ARCHITECTURE FOR INTEGRATED CIRCUIT DESIGN AND MANUFACTURE

(75) Inventors: Behnam Malekkhosravi, La Jolla, CA (US); Daniel J. Woodard, San Diego, CA (US)

(73) Assignee: Rapid Bridge LLC, San Diego, CA (US)

( * ) Notice: Subject to any disclaimer, the term of this patent is extended or adjusted under 35 U.S.C. 154(b) by 0 days.

(21) Appl. No.: 10/789,066

(22) Filed: Feb. 27, 2004

(65) Prior Publication Data

US 2005/0193353 A1    Sep. 1, 2005

(51) Int. Cl.
*G06F 17/50* (2006.01)
(52) U.S. Cl. .................. 716/2; 716/8; 716/10; 716/11; 716/12; 716/13
(58) Field of Classification Search ................ 716/1–2, 716/8–13, 16–19; 326/38–41, 47; 257/202–203, 257/206–211; 438/128
See application file for complete search history.

(56) References Cited

U.S. PATENT DOCUMENTS

| 6,504,398 B1 * | 1/2003 | Lien et al. ..................... 326/41 |
| 6,617,621 B1 * | 9/2003 | Gheewala et al. .......... 257/207 |
| 6,873,185 B1 * | 3/2005 | Cox ............................. 326/47 |
| 2002/0069396 A1 * | 6/2002 | Bhattacharya et al. ......... 716/7 |
| 2003/0188282 A1 * | 10/2003 | Yang et al. ................... 716/10 |
| 2003/0233628 A1 * | 12/2003 | Rana et al. ................... 716/18 |
| 2004/0224443 A1 * | 11/2004 | Wang et al. ................ 438/128 |

\* cited by examiner

*Primary Examiner*—Vuthe Siek
(74) *Attorney, Agent, or Firm*—DLA Piper Rudnick Gray Cary US LLP

(57) ABSTRACT

A system for integrated circuit (IC) design. A structural multi-project wafer (SMPW) comprises a plurality of pre-manufactured and pre-validated functional blocks. The SMPW is pre-fabricated up to a contact layer so that a user can customize and program different blocks of the SMPW to the user's requirements. An SMPW provider maintains an inventory of SMPWs. If one of the SMPWs can meet all of a user's IC design requirements, or can serve an intermediate step in a user's IC design process, such as market/concept validation or IP validation, the SMPW is provided to the user. The user can then proceed directly to production using a streamlined design flow having a very short cycle time of 1–3 months. Otherwise, the user proceeds to production using a normal design flow having a much longer cycle time.

17 Claims, 4 Drawing Sheets

METHOD AND ARCHITECTURE FOR INTEGRATED CIRCUIT DESIGN AND MANUFACTURE

FIELD OF THE INVENTION

The present invention relates to integrated circuit (IC) design and manufacture and, in particular, relates to a novel design platform addressing integrated circuit (IC) design and manufacturing issues encountered in sub-micron and advanced technologies.

BACKGROUND OF THE INVENTION

As IC technology advances, the complexity of chips increases and higher performance is required. As the industry moves towards a system on a chip model (SoC), uncertainties such as interface requirements and integration of analog blocks must be addressed and resolved. In considering an IC design flow, companies face two major issues: cost and risk.

Cost

Chip design and manufacturing costs for 0.13 µm and 90 nm technologies are estimated to be, respectively in the range of 14 million and 30 million dollars. Costs of this magnitude inhibit many startup companies, and even established companies, from developing products in 0.13 µm and below technologies. Cost components associated with chip design and manufacturing include, without limitation, design resources, acquisition and development of intellectual property (IP), EDA tools, fabrication masks, manufacturing, assembly, validation and verification.

Risk

As chip complexity increases, driven by industry SOC migration, the level of risk increases as well. Set forth below are some of the risk factors associated with development of advanced mixed signal ICs.

Time to Market. Development cycles have increased along with the complexity of the ICs, delaying product introduction cycles by 18 months or more.

Market Acceptance. Market acceptance is a fundamental problem, and can be achieved only by successful chip definition, low cost and short introduction time (time to market).

IP Availability. Complex, mixed signal ICs require many analog and digital IP components. In most cases, all required IPs are not available from the same source. Based on diverse levels of required expertise and depending on project requirements, IP design and development may need to be contracted out. IC manufacturers, fabrication houses and foundries develop multiple flavors of process technologies, i.e., low power, high performance, etc., to address customer requirements, which in turn affects IP availability across all processes.

IP Quality. Price erosion, downward pressure on the cost of IP development, lack of validation and lack of understanding of the overall system have led to serious IP quality issues. Complex analog blocks are sensitive to their surrounding environments, and analog IP is often developed without an understanding of the environment in which it will be incorporated. Advanced technologies and high speed signaling result in narrow design margins and, due to validation time and cost, analog IP providers have no means of validating their IP prior to its usage by end users. It is noteworthy that no analog IP vendor has managed to prove a successful business model.

Design Parameters. In 0.13 µm technologies and below, leakage, noise margin, reduced supply voltage and device mismatches have created a new set of design parameters that further complicate design of high performance analog circuits, causing more emphasis to be placed on silicon verified IP and system validitation.

Validation. Verification and validation of high performance ICs introduces another risk factor due to system environment and complexity. Many IP vendors are now required to validate their IPs in silicon. While this is a partial answer to the problem, validation increases cycle time and does not address solidity of design over process corners which, in effect, translates to yield. Moreover, validation of mixed signal IPs by IP vendors is done in a completely different environment and does not eliminate many risk factors. It is noteworthy that validation of complex IP blocks requires infrastructure, a characterization lab, which is costly and most IP providers do not have.

Yield. Before advanced technologies reach a maturation point, process parameters change and, depending on design time, performance and yield problems may manifest themselves. The overall IC yield is a product of the individual integrated IP yields, design marginalities and manufacturing yields. At present, there are no means for analyzing the yield of acquired IP blocks. Should IP be acquired from multiple sources, there is no guarantee that different IPs will provide a consistent yield across different manufacturing corners, resulting in serious yield loss at the chip level.

Development Cost. Development cost directly affects market acceptance and profit margins, which in turn drives cost structure and system quality.

Analog/Digital Integration. Because IP designers cannot consider all parameters associated with chip level integration, i.e., package, transistor count, supply noise, etc., IC designers must have a good understanding of circuit sensitivity in order to integrate the analog and digital blocks of the chip. The risk factors associated with analog/digital integration at the chip level, and the sensitivity of IP blocks and dependencies at the chip and system levels, are the reasons that many successful IC companies develop analog IPs internally.

Redesign. Redesign lengthens the development cycle, thereby delaying time to market and increasing cost, resulting in lower profit margins, reduced market acceptance and the possibility of missing the potential market window. This emphasizes the importance of first time silicon success without redesign.

Due to these many cost and risk factors, migration to advanced technologies and SOCs has become a barrier that many companies cannot overcome and has created a roadblock in the industry. While several "band aid" solutions have been developed, which are discussed below, there is a clear need for a different and revolutionary design platform that allows easy migration to advanced technologies and SOC design.

Attempted Solutions

The engineering community has attempted to address these problems by forming standards bodies to create standard platforms for specification and validation, and to lower the barriers to adoption and improve overall system quality. Standards are developed across different technologies addressing different bottlenecks. Examples include input and output standards, memory controller standards, parallel and serial link standards such as USB, PCI, Infiniband, IEEE 802.11, and so on.

IC manufacturers have adopted large foundry rule sets and device performance to minimize manufacturing variability in advanced technologies. An example is the adoption of TSMC design rules as a standard by many independent device manufacturers (IDMs) and manufacturing houses. By consolidating processes, barriers to technology portability are reduced and overall energy is focused on bringing up fewer technologies through collaboration. Many IC companies are also developing their designs based on merged rule sets to allow for second sourcing and reduction of possible manufacturing issues and cost.

Other design concepts have also been developed to address the aforementioned risk and cost issues. The proposed solutions, discussed below, while addressing some aspects of the problems, fail to provide a platform that addresses all issues.

Field Programmable Gate Array (FPGA) Design Flow

A field programmable gate array (FPGA) is an IC that can be programmed in the field after manufacture to carry out a specific function. FPGAs are readily available in different configurations and sizes. FPGAs are similar in principle to, but have vastly wider potential application than, programmable read-only memory (PROM) chips.

FPGAs provide a cost effective solution for concept validation and address many aspects of time to market and IP availability. Recent FPGAs provide complex IP blocks in advanced technologies, and reduce risks associated with IP integration and quality. The shortfalls of FPGAs, however, are in the areas of potential usage, performance and production costs. Potential usage is limited to the rigid FPGA structure and its pre-defined IP blocks. Due to the nature of FPGA design, performance is limited and in general only lower frequency ranges can be accommodated. Relative to COT and ASIC flow (discussed below) in the same technologies, FPGAs provide only ⅕ to ⅓ of the performance. High production costs prohibit moderate to high volume designs from having competitive ASPs. Increased cost of development has helped FPGA companies in recent years, such as Xilinx, Altera and so on. More FPGA companies are forming to meet the market demand.

Structural Array (SA) Design Flow

Structural arrays were developed to address the production cost associated with FPGAs and to reduce the performance gap between FPGAs and COT flow. SAs typically have a lower cost for larger production volumes than FPGAs. In some instances, structural arrays can provide larger gate counts, better performance and wider IP selection than FPGAs. Depending on the definition of the SA, companies providing these platforms may experience success. One successful example is LSI's Rapid Chip.

Like FPGAs, however, SAs have a rigid structure that reduces the possibility of their use in productions. Also, there is a longer design time associated with SAs (typically 2–6 months) than there is with FPGAs (typically 1–3 months). In general, SAs do not provide great added advantage relative to FPGAs and, consequently, have not been the subject of widespread acceptance in the industry. This may change as cost of development and performance issues take on even greater weight.

ASIC Design Flow

Design and manufacturing services are provided by major chip manufacturers such as IBM, TI, ST, Phillips, etc. System houses normally provide specifications for Application Specific Integrated Chips (ASICs) to these ASIC providers. ASIC providers deliver finished products according to the specification. ASIC design flow has been gaining momentum recently because it minimizes the risk factors associated with advanced technologies, required knowledge and the availability of IP. The primary issues associated with ASIC flow are the cost of production, which relatively few manufacturers can afford, and the transferability of the finished ASIC to a COT flow (described below). Hence, ASIC design flow is primarily used where cost of production is secondary to minimizing risk, and the design is used in a system that does not require market validation.

Customer Owned Tooling (COT)

COT is the most commonly used design flow for high performance products that have demanding time-to-market requirements. In a typical COT flow, a system house works directly with a pure-play foundry for silicon manufacture. A COT flow generally means that the system house takes its design with all the associated risk all the way through to physical implementation. The resulting GDSII representation of the design is, in theory, ready for silicon fabrication and packaging.

COT flow has been shown to deliver the highest performance and smallest die size. COT data pathways typically have 30–50% faster performance and 25–50% smaller die size relative to an equivalent ASIC. COT design flow, from the IC specification, typically involves the steps of RTL codification, synthesis, static timing analysis and place and route. Of importance, and a major contributing factor to the typical design cycle time of 12–24 months, COT design flow also requires the steps of IP design, acquisition, integration and floor planning.

The greatest advantage provided by COT flow is control: the chip designer is exclusively in control of the process and makes its own decisions about tools, flows, etc. The chip designer has complete control over the timetable and may intervene at any stage in the process without significant loss of time. In an ASIC flow, by contrast, information must be exchanged between different organizations, and the timing and availability of such interventions is at the mercy of the ASIC vendor. Once the initial investment in the COT flow is made, production volume and turnaround times are greatly enhanced. Another significant advantage of COT flow is that all design experience, IP and knowledge is internally owned.

Along with the high rewards of COT flow comes high risk. In COT flows, the chip design and integration of IP are not guaranteed to work properly on the first revision of the silicon, as in ASIC flow. This exposes system houses to a tremendous amount of financial and product introduction risk. In most cases, in order to get the silicon working properly, system houses must iterate the IC design 1–3 times, which adds development costs and delays product introduction. The cost of developing an IC via a COT flow requires a significant and costly infrastructure investment. It takes more tools, personnel and expertise to manage the end-to-end flow. A broad knowledge base is required. Hence, the shortcomings of COT flow include acquiring the knowledge for different aspects of the design, acquiring or developing the required IP, management of risk and cost, and inadequate support for concept and market validation, which results in higher risk and potential need for multiple redesigns.

SUMMARY OF THE INVENTION

The present invention provides a novel design platform addressing integrated circuit (IC) design and manufacturing issues encountered in sub-micron and advanced technologies. Design and manufacturing costs and risks associated with advanced technologies are overcome while design and validation cycles are minimized.

Accordingly, one embodiment of the invention is a system for integrated circuit (IC) design. The system comprises at least one structural multi-project wafer (SMPW) composed of a plurality of pre-manufactured and pre-validated functional blocks, and a streamlined IC design flow incorporating the SMPW and having no IP integration or floor planning requirements.

Another embodiment of the invention is a component architecture for use in a streamlined integrated circuit (IC) design process. The component architecture comprises a plurality of sub-blocks targeted to specific applications. The architecture is pre-fabricated up to a contact layer in order to allow a user to customize and program the sub-blocks to the user's requirements through metallization. In one implementation, the pre-defined sub-blocks are based on readily defined standards.

Another embodiment of the invention is a method for designing an integrated circuit (IC). A plurality of structural multi-project wafers (SMPWs) are provided. Each SMPW comprises a plurality of pre-manufactured and pre-validated functional blocks. If one of the plurality of SMPWs meets an IC designer's requirements, the method proceeds to a streamlined design flow and production. Alternatively, if one of the plurality of SMPWs is usable as an intermediate step, the usable SMPW components are extracted for use in a COT design flow. Finally, if one of the plurality of SMPWs does not meet an IC designer's requirement and is not usable as an intermediate step, any usable IP from the plurality of SMPWs is extracted for use in a COT design flow.

Another embodiment of the invention is a method for providing integrated circuit design assistance. An inventory of structural multi-project wafers (SMPWs) is maintained, wherein each SMPW comprises a plurality of pre-manufactured and pre-validated functional blocks. The method further comprises determining whether one of the inventory of SMPWs can meet all of a user's IC design requirements or can serve an intermediate step in a user's IC design process, such as market/concept validation or IP validation and, if so, providing the SMPW to the user.

The various embodiments of the present invention provide many advantages relative to the prior art. One advantage is cost reduction. Because SMPWs are used by multiple users, manufacturing costs are shared and costs are significantly reduced. Another advantage is accessibility to validated IP from the same source, permitting seamless integration of all IPs. Another advantage is seamless market and concept validation, production and risk reduction. Another advantage is frequent manufacturing of the inventive SMPW by the foundries, resulting in enhanced yield. Another advantage is risk elimination due to wide usage and validation of IPs within SMPWs by multiple users. Another advantage is flexibility in assembly and packaging of the customized SMPW die to meet different system requirements and cost structures (i.e., wire-bond, flip chip, BGA, etc.). Another advantage is the flexibility to use different EDA tool sets.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

The present invention provides a revolutionary approach to the cost and risk issues surrounding complex IC design and manufacture—a structural multi-project wafer (SMPW). The inventive SMPW comprises multiple pre-manufactured and pre-validated sub-blocks. Each sub-block is targeted to a specific application, function or interface.

Presently, major fabrication houses provide multi-project wafers (MPWs or shuttles) as test vehicles to their customer base, in which the cost of manufacturing is shared among multiple users, significantly reducing customer manufacturing cost. MPWs or shuttles are used primarily for early system verification or as risk reduction vehicles. The SMPW of the present invention, by contrast, comprises pre-defined structures that are pre-fabricated to the contact level and allows for customization for specific applications. Relative to MPWs, SMPW fabrication time is significantly reduced because they are pre-manufactured to the contact level.

Figure 1:
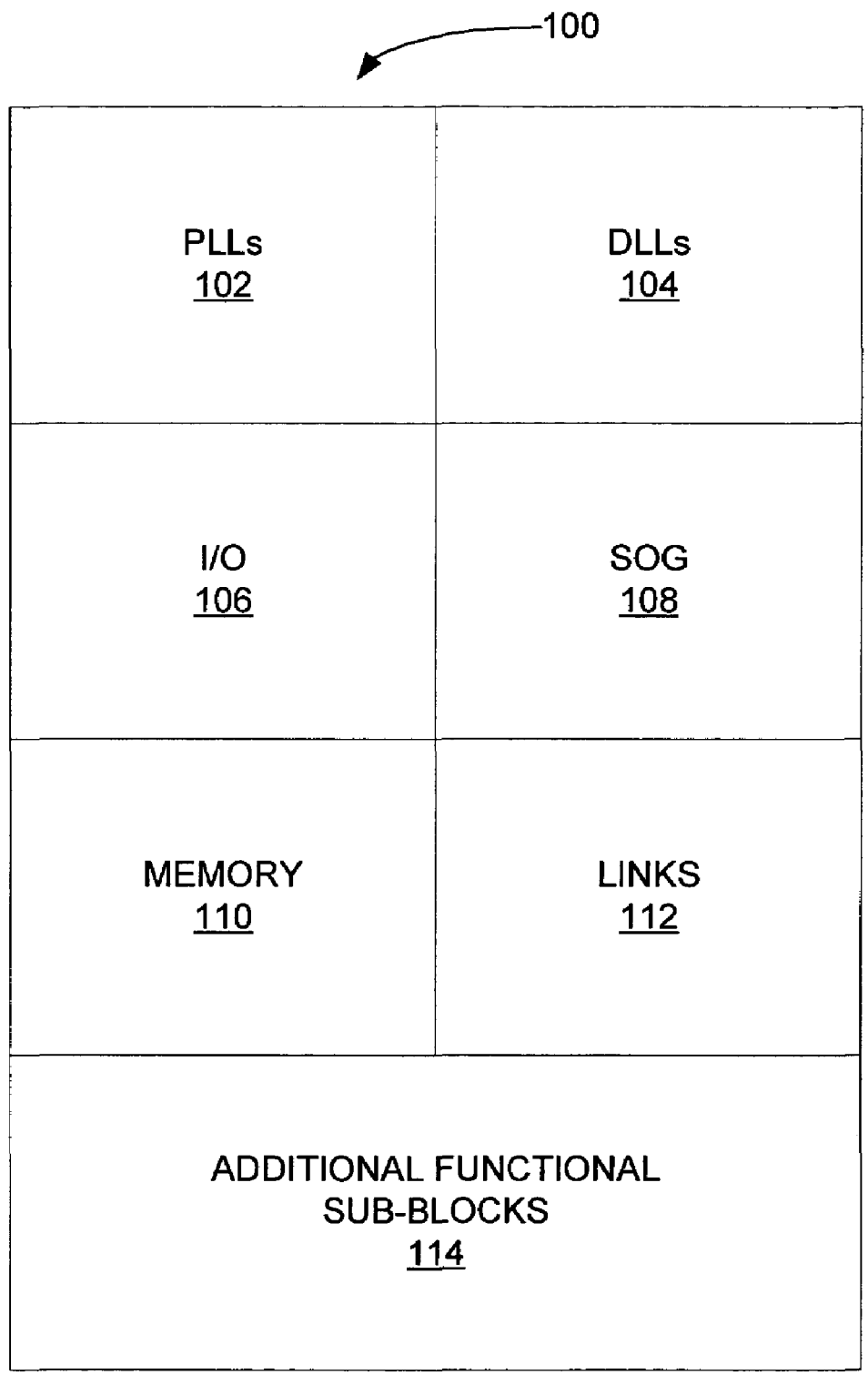
FIG. 1 is a block diagram of a structural multi-project wafer (SMPW) according to the present invention.

One implementation of an SMPW 100 according to the present invention is depicted in FIG. 1. SMPW 100 comprises multiple pre-built and pre-verified sub-blocks or structural arrays targeted to specific applications. In this regard, it should be noted that the particular sub-blocks depicted in FIG. 1 are for illustrative purposes only, and that an SMPW according to the present invention may have sub-blocks differing from, or in addition to, those depicted.

PLL sub-block 102 comprises multiple metal programmable PLLs. The PLLs may address frequency ranges from 100 MHz to 2 GHz, and applications such as clock multiplication, de-skewing and spread spectrum.

DLL sub-block 104 comprises multiple master/slave DLLs. The DLLs may address frequency ranges from 100 MHz to 2 GHz, and applications such as providing interface timing.

I/O sub-block 106 comprises metal programmable I/O elements that may be directed to applications and standards such as LVDS, SSTL, HSTL, DDRII, LVTTL, and so on.

SOG sub-block 108 is a sea of gates block allowing for synthesis of millions of gates. In one implementation, SOG block 108 comprises standard cell libraries that are usable in an industry standard COT flow.

Memory block 110 provides a desired amount and form of memory. In one implementation, memory block 110 is augmented by register files.

Links sub-block 112 provides high speed serial and/or parallel links. Examples include Hypertransport, SDRAM and SPI4-2.

Again, SMPW is not limited to the above sub-blocks, as indicated in FIG. 1 by additional functional sub-blocks 114. An SMPW may include, for example, microprocessor cores and blocks for implementing bus functions. The particular sub-blocks employed in SMPW 100 is dependent on the market segment being addressed (i.e., consumer, wireless, etc.).

The combination of the PLLs, DLLs, I/O elements and other functional blocks allows the end user to manufacture application specific ICs meeting a wide range of markets without sacrificing performance. Partnerships with soft IP companies will facilitate predefined functional blocks meeting customer needs, such as memory interfaces and controllers, processors, physical and link layers, and so on.

SMPW 100 is pre-fabricated up to the contact layer in order to allow the end user to customize and program different sections of the chip to their requirements through metallization. This minimizes the design and fabrication cycle, along with the mask cost. Should a pre-defined SMPW meet all of a user's requirements, it can be taken directly into production (step 206 of FIG. 2, discussed below). If an SMPW is used as an intermediate step for concept or IP validation, all blocks are identical and available as IP blocks in a standard COT flow (steps 208 and 210 of FIG. 2, discussed below). Design and redesign using SMPWs is cost effective as it requires only partial processing steps (metal up), and the cost is shared amongst several customers using the particular SMPW.

A significant item of end user expense that is often overlooked is package design. In accordance with the present invention, each SMPW may be accompanied by a selection of assembly and packaging choices. Hence, the packaging is flexible and may be dictated by system requirements and cost structures. Packaging choices may include, without limitation, wire-bond, flip chip, BGA, plastics and ceramics.

Figure 2:
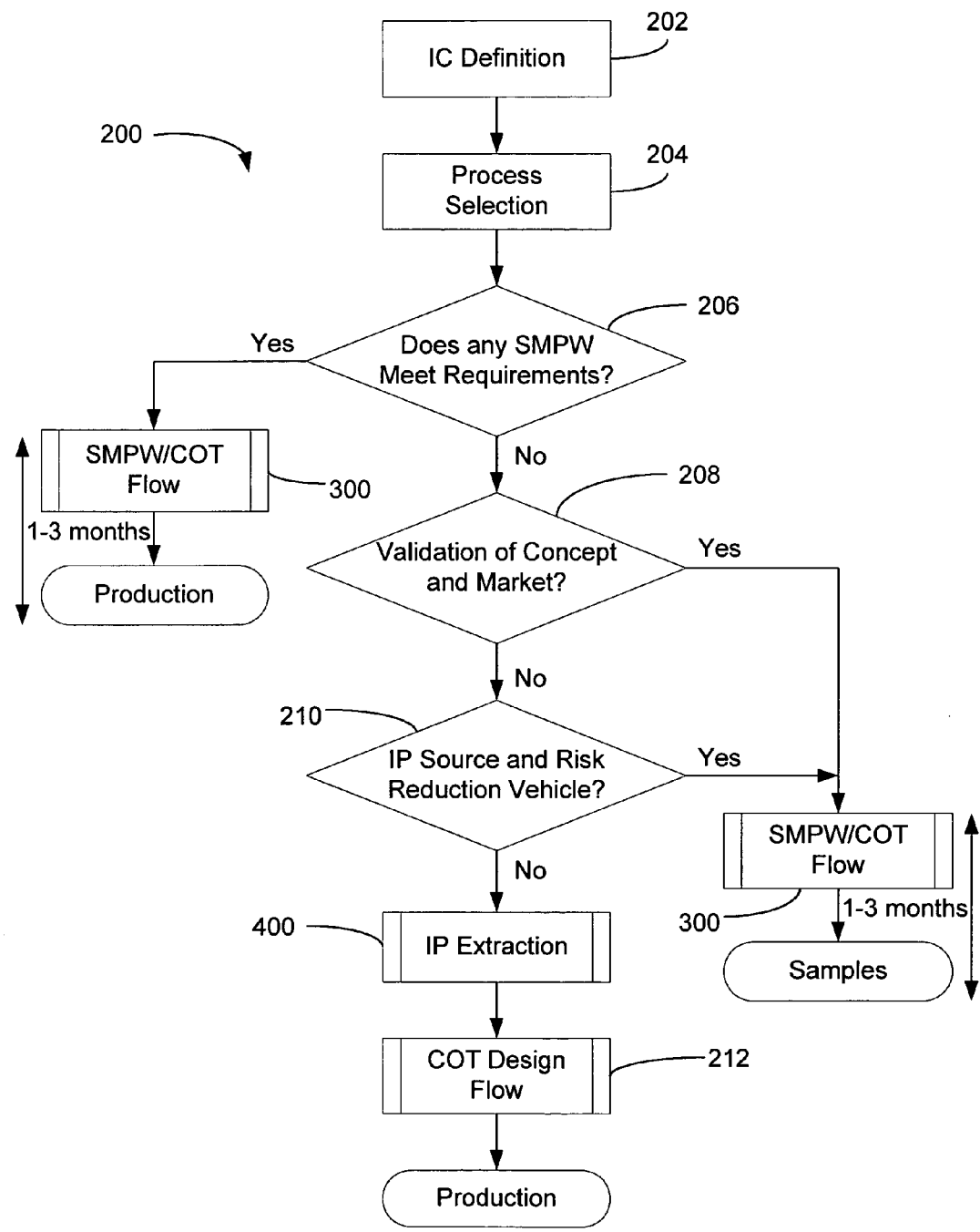
FIG. 2 is a flow diagram of an IC design method according to the present invention.

FIG. 2 is a flow diagram of an IC design method 200 according to the present invention. Steps 202 and 204 involve IC definition and process selection. In step 206, a determination is made as to whether an existing SMPW meets all of a user's IC performance and feature set requirements. If an existing SMPW does meet requirements, the method seamlessly proceeds directly to SMPW/COT design flow 300 and actual production of the chip, which is depicted in detail in FIG. 3.

If no existing SMPW meets all of a user's requirements, steps 208 and 210 ask whether existing SMPWs may still be of use as an intermediate step for concept/market/IP validation. In step 208, a determination is made as to whether an existing SMPW can serve in concept or market validation. In step 210, a determination is made as to whether an existing SMPW can serve as an IP source and/or a risk reduction vehicle. If the answer to either of these questions is "yes", the method proceeds to SMPW/COT design flow 300 (FIG. 3) and production of samples for concept/market validation or to serve as IP sources.

Figure 3:
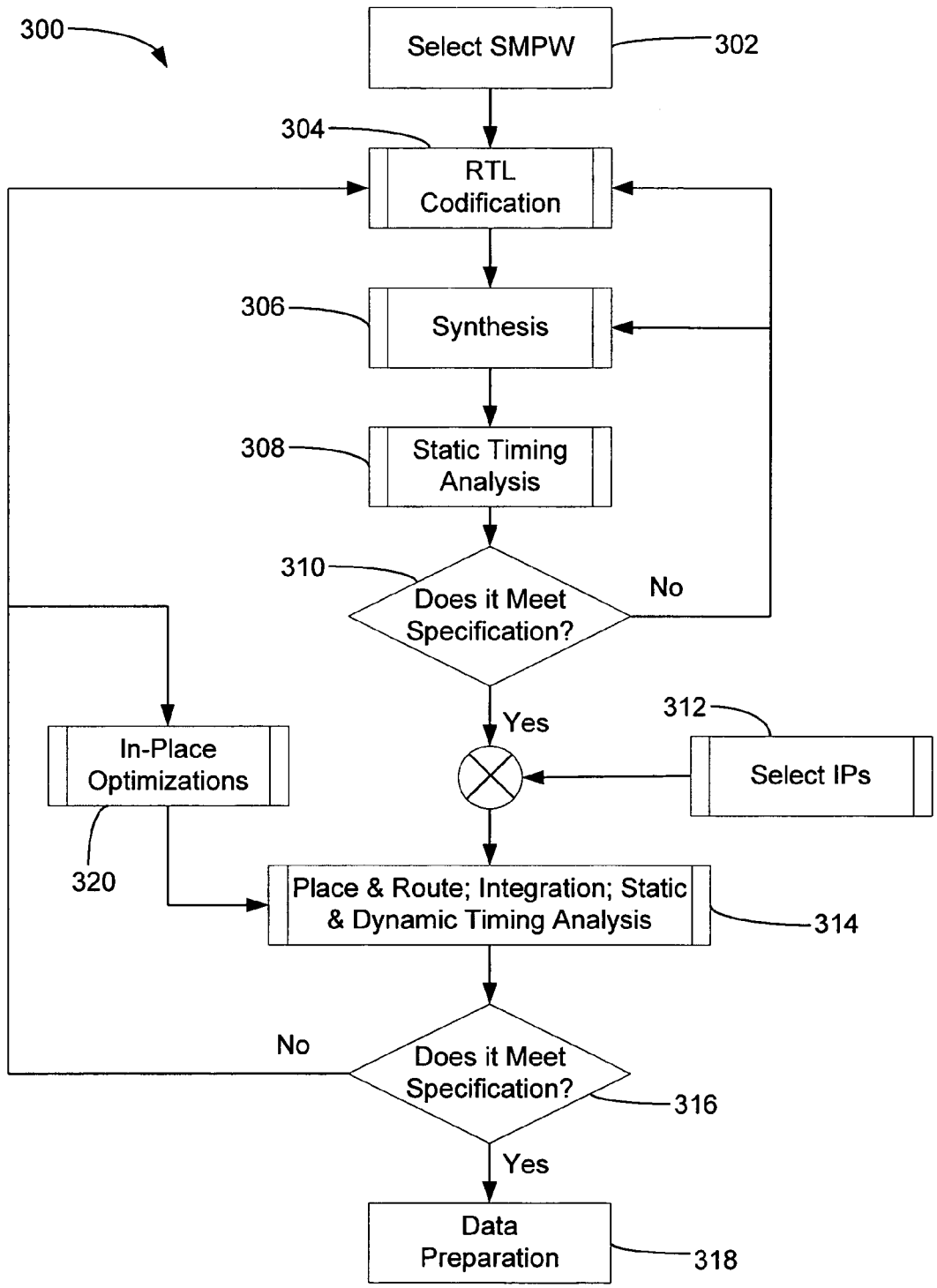
FIG. 3 is a flow diagram of an SMPW/COT design method according to the present invention.

A major advantage of the present invention is that, where an SMPW meets requirements or can serve as an intermediate step towards market/concept validation or as an IP source, the usable SMPW component(s) can be used in a streamlined SMPW/COT design flow. The streamlined SMPW/COT design flow 300 is depicted in FIG. 3. In step 302, an SMPW is selected in accordance with flow 200 of FIG. 2. RTL codification, synthesis and static timing analysis is performed in, respectively, steps 304, 306 and 308.

At this juncture, a very important distinction is made by the present invention over typical COT design flow: there is no need for IP integration or floor planning. The IP is already integrated into the SMPW, and of course, the floor planning has already been done for the SMPW. In a typical COT design flow (beginning from an IC specification rather than an SMPW), in addition to RTL codification, synthesis and static timing analysis, IP integration and floor planning would need to be carried out. For this reason, the SMPW/COT design flow time of the present invention is dramatically reduced to 1–3 months, as compared to 12–24 months for a typical COT design flow.

If the specification is not met at this point (step 310), further RTL codification and synthesis is carried out. Otherwise, if the specification is met, the flow proceeds to add any other selected IPs (pre-validated by the SMPW holder/foundry) in step 312 and then to placement and routing, integration; and static and dynamic timing analysis in step 314. Once again, a determination is made as to whether the specification has been met (step 316). If it has, the flow concludes with data preparation ("tape out") in step 318, and the IC is ready for production. If not, further RTL codification (step 304) and in-place optimizations (step 320) are performed until specification is met.

With respect to FIG. 3, it should be noted that IP selection (step 312) may logically take place before RTL codification, synthesis and static timing analysis (steps 304-308). It should also be noted that suitable design tools might combine the synthesis, static timing analysis and place and route steps into a single physical synthesis step.

Figure 4:
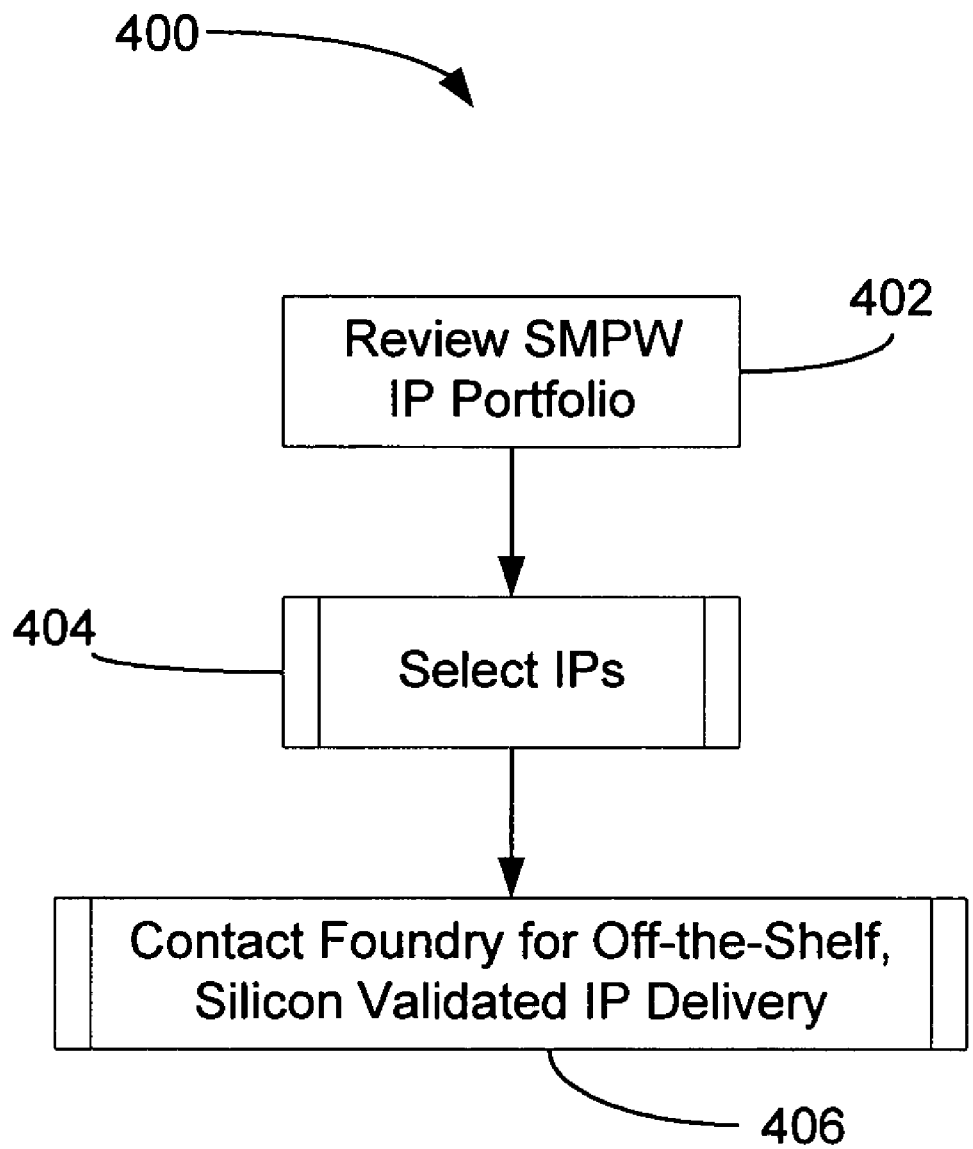
FIG. 4 is a flow diagram of an IP extraction method according to the present invention.

Returning to FIG. 2, if no existing SMPW meets requirements (step 206), and no existing SMPW is of use as an intermediate step in concept/market validation (step 208) or as an IP source (step 210), then the customer will need to follow a typical and lengthier COT design flow in producing the IC. Even in this scenario, however, useful IP might still be extracted from the SMPW manufacturer. Accordingly, in step 400, a determination is made as to whether useful IP may be extracted from the foundry or other holder of the SMPW knowledge base. The steps involved in IP extraction are depicted in FIG. 4. In step 402, the user reviews the SMPW owner's portfolio of IP. Useful IP blocks are selected in step 404, and the foundry or SMPW/IP owner is contacted in step 406 for silicon-validated, off-the-shelf IP delivery. The extracted IP is then employed by the user in a typical COT design flow 212 and the IC proceeds to production.

Finally, it should be noted that even if no existing SMPW meets a user's requirements or is deemed useful as an intermediate step, a new SMPW could be created for the user. The new SMPW would then become part of the inventory of SMPWs, available to future users.

Hence, the SMPWs effectively address multiple market needs: time to market is reduced; concept validation is provided for; risk and cost are reduced; manufacturing and yield problems are minimized; and IP acquisition and quality issues are negated. End users have access to multiple pre-defined and pre-fabricated structural arrays at a fraction of the manufacturing expenses for the entire design since the cost of the design may be spread out among multiple end users. Access to the multiple functional sub-blocks eliminates the need for IP acquisition and validation. Metal programmability allows fast turn around time (time to market) and provides a means for concept validation as well as a headstart in the development cycle. The end user has early access to silicon for system definition and design. The accelerated path to concept validation provided by the present invention can be very important to end users seeking to raise funds.

Importantly, an additional advantage is provided: seamless transition to a COT flow. Seamless transition to a COT flow occurs since all sub-blocks that a user might need are available on the SMPW and standard COT flow support, as opposed to the specific and particular functions provided by each FPGA/SA constrained with respective tool flows and programmabilities. All building blocks are readily validated resulting in risk reduction and avoidance of costly redesigns. Seamless transition to a COT flow overcomes the drawbacks associated with FPGA/SA flow: volume production is addressed; yield issues, production risk and cost are minimized; and analog/digital integration problems are eliminated.

This inventive design platform provides a complete "plug and play" concept for the analog IP world, creating new growth paths and untapped markets. Emphasis is placed on design and manufacturing, rather than IP. Rather than relying on outside vendors for IP, the foundry keeps an inventory of SMPWs (which hold the IP) and can address any manufacturing concerns such as yield. Since the SMPWs will be held and controlled by the manufacturer, the manufacturer can take hold of the process and guarantee high quality, reduced pricing structure, and elimination of price erosion problem that is affecting quality and reliability of IP. The design platform of the present invention addresses multiple issues associated with IC design and manufacture, and will permit consolidation of the fragmented IC industry.

While various embodiments of the invention have been described, it will be apparent to those of ordinary skill in the art that many more embodiments and implementations are possible that are within the scope of this invention.

What is claimed is:

1. A method for designing an integrated circuit (IC) comprising:
    providing a plurality of structural multi-project wafers (SMPWs), each SMPW comprising a plurality of pre-manufactured and pre-validated dice, each die configured to be separately programmed into a customized concept validating IC;
    if one of the plurality of SMPWs meets an IC designer's requirements, proceeding to a streamlined design flow and production for fabricating separate ICs from each of the concept validating ICs, the design flow having no IP integration or floor planning requirements;
    if one of the plurality of SMPWs is usable as an intermediate step, extracting at least one of a usable SMPW component and an SoC structure for use in a normal COT flow; and
    if one of the plurality of SMPWs does not meet a user's requirement and is not usable as an intermediate step, extracting at least one of a usable IP and an SoC structure from the plurality of SMPWs for use in a normal COT flow.

2. The method of claim 1, wherein the streamlined design flow has a cycle time of 1–3 months and wherein the normal COT design flow has a cycle time of 12–24 months.

3. A system for integrated circuit (IC) design comprising:
    at least one structural multi-project wafer (SMPW) comprising a plurality of pre-manufactured and pre-validated dice, each die configured to be separately programmed into a customized concept validating IC; and
    a streamlined IC design flow for fabricating separate ICs from each of the concept validating ICs of the SMPW, the design flow having no IP integration or floor planning requirements.

4. The system of claim 3, wherein the dice of the SMPW comprise structural arrays.

5. The system of claim 3, wherein the SMPW is pre-fabricated up to a contact layer so that a user can customize and program different ones of the dice of the SMPW to the user's requirements.

6. The system of claim 3, wherein the IC design flow has a cycle time of approximately 1–3 months.

7. The system of claim 3, wherein the dice each have circuits chosen from a group comprising; gate arrays, mixed signal blocks, analog blocks, digital blocks, and memory blocks.

8. A method for providing integrated circuit design assistance comprising:
    maintaining an inventory of structural multi-project wafers (SMPWs), each SMPW comprising a plurality of pre-manufactured and pre-validated dice, each die configured to be separately programmed into a customized concept validating IC; and
    configuring a streamlined IC design flow for fabricating separate ICs from each of the concept validating ICs of the SMPW, the design flow having no IP integration or floor planning requirements.

9. A method as claimed in claim 8, wherein the dice are metal programmable to a user's specific requirements.

10. A method as claimed in claim 8, further comprising:
    determining whether one of the inventory of SMPWs can meet all of a user's IC design requirements or can serve an intermediate step in a user's IC design process.

11. A method as claimed in claim 10, further comprising:
    determining whether at least one of an IP component and an SoC structure satisfies a user's requirement and is contained within the inventory of SMPWs.

12. A method as claimed in claim 8, and further comprising:
    reducing manufacturing costs to users by sharing the SMPWs among multiple users.

13. A method as claimed in claim 8, and further comprising:
    maintaining a pool of validated IP that is embodied in the inventory of SMPWs.

14. A method as claimed in claim 13, and further comprising:
    transferring least one of an IP component and an SoC structure from the pool of validated IP from programmable logic for use in COT flow.

15. A method as claimed in claim 8, and further comprising:
    facilitating migration to a COT flow with the inventory of SMPWs.

16. A method as claimed in claim 8, and further comprising:
    providing multiple packaging and assembly options for SMPW users.

17. A method as claimed in claim 16, wherein the packaging and assembly options are chosen from a group comprising: wire bond, flip chip, BGA, plastics and ceramics.

* * * * *